United States Patent [19]
Weisbach

[11] 3,755,299
[45] Aug. 28, 1973

[54] 6-HETEROCYCLIC SUBSTITUTED PENICILLINS

[75] Inventor: Jerry A. Weisbach, Cherry Hill, N.J.

[73] Assignee: Smith Kline & French Laboratories, Philadelphia, Pa.

[22] Filed: Aug. 13, 1971

[21] Appl. No.: 171,714

[52] U.S. Cl. .............................. 260/239.1, 424/271
[51] Int. Cl. .......................................... C07d 99/16
[58] Field of Search ................................ 260/239.1

[56] References Cited
UNITED STATES PATENTS 3,579,506  5/1971  Lemieux et al. ................. 260/239.1
3,657,224  4/1972  Heuser ............................ 260/239.1

FOREIGN PATENTS OR APPLICATIONS 986,554  3/1965  Great Britain .................. 260/239.1

Primary Examiner—Nicholas S. Rizzo
Attorney—William H. Edgerton et al.

[57] ABSTRACT

6-Heterocyclic α-amino or α-hydroxyacetamidopenicillins are prepared by conventional 6-acylation reactions. The products are antibacterial agents.

7 Claims, No Drawings

6-HETEROCYCLIC SUBSTITUTED PENICILLINS

The invention relates to chemical compounds known as penicillins. In particular, the invention relates to penicillins with a 6-α-amino or α-hydroxy heterocyclic acetamido group. The compounds are represented by formula I,

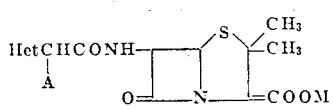

where Het is a 5 or 6 membered ring containing carbon and at least 2 hetero atoms from the group consisting of O, N, and S;

A is OH or $NH_2$; and

M is H or a pharmaceutically acceptable cation such as an alkali metal or an organic ammonium ion.

Among the groups represented by the designation "Het" are 2-thiazolyl, 4-thiazolyl, 5-thiazolyl, 2-oxazolyl, 4-oxazolyl, 5-oxazolyl, 3-isothiazolyl, 4-isothiazolyl, 5-isothiazolyl, 3-isoxazolyl, 4-isoxazolyl, 5-isoxazolyl, 1,2,4-thiadiazol-3-yl, 1,2,4-thiadiazol-5-yl, 1,2,5-thiadiazol-3-yl, 1,3,4-thiadiazol-2-yl, 1,2,4-oxadiazol-3-yl, 1,2,4-oxadiazol-5-yl, 1,3,4-oxadiazol-2-yl, imidazol-2-yl, imidazol-4-yl, tetrazolyl, 1,2,3-triazol-4-yl, 1,2,4-triazol-3-yl, pyrazol-3-yl, pyrazol-4-yl, pyrazinyl, pyrimidin-2-yl, pyrimidin-4-yl, pyrimidin-5-yl, pyridazin-3-yl, pyridazin-4-yl, 1,2,3-triazin-4-yl, 1,2,3-triazin-5-yl, 1,2,4-triazin-3-yl, 1,2,4-triazin-5-yl, 1,2,4-triazin-6-yl, and 1,3,5-triazin-2-yl.

While the unsubstituted heterocyclic rings are preferred, the lower alkyl substituted heterocyclic groups named above are also within the definition of the term Het.

The compounds of this invention are antibacterial agents, to be used against a wide variety of Gram-positive and Gram-negative infections. They are to be used to prevent or treat these infections in the same manner and dosages as are other, known penicillin antibacterial agents. These compounds can be administered by injection or orally. The compounds are formulated in the manner known for other penicillin products.

The compounds of the invention are prepared by acylating the amino group of 6-aminopenicillanic acid (6-APA), or a salt, ester, or other conventional derivative thereof, with the appropriate heterocyclic glycine or heterocyclic glycolic acid. Prior to acylation it is desirable to protect the amino group of the glycine with an easily removable group. This is best done using the acetoacetic ester enamine adduct described by Dane and Dockner [Angw. Chem. 76 342 (1964)]. Alternatively, in certain cases 2-heterocyclic-2-azido acetic acids can be attached to the 6-amino group of the penicillin nucleus by conventional acylation procedures, and the azido group subsequently reduced to the amine. Similarly, the hydroxyl group of the glycolic acid side chain can be protected for the acylation step by conversion to dichloroacetoxy, trimethylsilyloxy, or similar commonly used blocking group. For the acylation of the penicillin nucleus, the carboxyl group of the heteroglycine or heteroglycolic acid can be activated by conversion to the acid chloride or to a mixed anhydride with, for example, lower alkyl chloroformates. The carboxyl group also can be activated by conversion to the 2,4-dinitrophenyl ester. Alternatively, the protected heteroglycine or glycolic acid can be activated for condensation with the nucleus ester by reacting it first with carbonyl diimidazole or its equivalent. The particular reactions involved are all well known to the art. Conversion of the carboxyl group of a final product to a salt is accomplished by well known methods.

The starting heterocyclic glycines and glycolic acids either are known or are obtained by known methods. The glycines are best prepared by hydrolysis of the corresponding α-aminonitrile or the hydantoin. The preparation of α-aminonitriles and hydantoins is thoroughly described in the literature, for example, by reacting an appropriate aldehyde with hydrogen cyanide and ammonia or ammonium carbonate. Heterocyclic aldehydes are synthesized in a variety of ways depending on the heterocyclic ring involved and the availability of suitable starting materials. Such synthesis include the hydrolytic reduction of heterocyclic nitriles prepared, in turn, from the halo-substituted heterocycle and a metal cyanide; by the controlled catalytic or metal hydride reduction of acid chlorides; by oxidation of heterocyclic methanols, for example, using manganese dioxide; by the hydrolysis of heterocyclic gem-di-halides; by the condensation of lithium heterocycles with dimethylformamide; or by treating halo-methyl heterocycles with hexamine and subsequently hydrolyzing the quaternary ammonium adduct.

Alternatively, heterocyclic glycines are prepared by reacting α-halo-heterocyclic-substituted acetic acids with ammonia or by reacting the halo compound with a metal azide with subsequent reduction to the amine. Likewise, either heterocyclic α-keto acids or heterocyclic acetic acids can be converted to the oxime which, in turn, is reduced to the corresponding glycine. Finally, when the halgen atom is sufficiently reactive on a heterocyclic system the halo substituted heterocycle can be reacted with acetamidomalonic ester in the presence of alkoxide ion and the adduct hydrolyzed, with decarboxylation, to the heterocyclic glycine.

In a similar manner there are a number of synthetic routes for preparing the heterocyclic glycolic acids. Again the choice of method depends on the heterocyclic system involved and the available starting material. Heterocyclic glyoxylic acids are reduced by metal hydrides to give the corresponding heterocyclic glycolic acid. The glyoxylic acid is prepared by reacting the lithium heterocycle with diethyl oxalate or with ethyl oxalyl chloride. Alternatively, the heterocycle may be reacted with ethyl oxalyl chloride in the presence of aluminum chloride. Glycolic acids are also obtained from heterocyclic aldehydes by reaction with hydrogen cyanide and subsequent hydrolysis of the cyanohydrin. Alternatively, heterocyclic methyl ketones are oxidized to the heterocyclic glyoxal using selenium dioxide and this is rearranged by treatment with alkali hydroxides to the α-hydroxy heterocyclic acetic acid. The heterocyclic glycines can be converted to the corresponding glycolic acid by treatment with nitrite ion in an aqueous mineral acid. Additionally, a heterocyclic aldehyde can be reacted with chloroform in the presence of potassium t-butoxide and the resulting α-heterocyclic trichloroethanol is hydrolyzed to the glycolic acid. Finally, heterocyclic α-haloacetic acids are converted to the glycolic acid by treatment with alkali.

As examples, 2-thiazolecarboxaldehyde is prepared from 2-bromothiazole by reaction with butyl lithium followed by reacting the lithium heterocycle with dimethylformamide. The aldehyde reacts with sodium cyanide and ammonium carbonate to give the hydantoin, which upon alkaline hydrolysis generates the 2-thiazolylglycine. Reaction of the 2-thiazolecarboxaldehyde with hydrogen cyanide gives the cyanohydrin which is hydrolyzed by alkali to the 2-thiazolylglycolic acid. In a similar manner the 4- and 5-isomers of thiazolylglycine and thiazolylglycolic acid are prepared from the appropriate thiazole aldehyde. Similarly, the isothiazole-3-acetic acid is converted to its ethyl ester and brominated at the α-carbon atoms using N-bromo-succinimide. Treatment of the α-bromoisothiazole-3-acetic acid ester with hot aqueous alkali and subsequent acidification gives the 3-isothiazoleglycolic acid. Likewise, acid hydrolysis of the α-bromo-3-isothiazoleacetic acid ethyl ester followed by treatment with ammonia in alcohol (sealed tube) yields the 3-isothiazoleglycine. The 4- and 5-isothiazoleglycolic acids and isothiazoleglycines are prepared in an analogous manner. Alternatively, isothiazole-5-glycolic acid is obtained by reducing isothiazole-5-glyoxylic acid with sodium borohydride. 1,2,-,3-Thiadiazole-4-carboxaldehyde is prepared from 4-methyl-1,2,3-thiadiazole by α-bromination using N-bromosuccinimide followed by treatment of the bromomethylthiadiazole with hexamethylenetetramine and subsequent steam distillation. The 1,2,3-thiadiazole-4-carboxaldehyde is converted to the corresponding thiadiazole-4-glycolic acid and 4-glycine by reaction with hydrogen cyanide or hydrogen cyanide and ammonia with subsequent hydrolysis. The 1,2,3-thiadiazole-5-glycolic acid and the 5-glycine are made in the same manner starting with 5-methyl-1,2,3-thiadiazole. 1,2,5-Thiadiazole-3-glycolic acid and 3-glycine and the corresponding 1,3,4-thiadiazole analogs can be made by the same reaction sequence starting from 3-methyl-1,2,5-thiadiazole and 2-methyl-1,3,4-thiadiazole, respectively. Similarly, 1,2,4-thiadiazole-3-glycine and 3-glycolic acid are prepared by this reaction sequence starting with 3-methyl-1,2,4-thiadiazole. The 1,2,4-thiadiazole-5-glycine and 5-glycolic acid are prepared by a different route. Here one reacts 5-chloro-1,2,4-thiadiazole with diethyl acetamidomalonate in the presence of sodium ethoxide followed by acid hydrolysis of the C-alkylated product. This yields the 1,2,4-thiadiazole-5-glycine which can be converted to the 5-glycolic acid by reaction with aqueous nitrous acid.

Oxazole-4-carboxylic acid ethyl ester is reduced to oxazole-4-methanol using lithium tri(β-methoxyethoxy) aluminum hydride. This is reaction with activated manganese dioxide in methylene chloride to give oxazole-4-carboxaldehyde. The aldehyde is converted to oxazole-4-glycolic acid and oxazole-4-glycine by the methods already described.

The preparation of 5-isoxazoleglycine is described in Chem. Pharm. Bull. 14, 89 (1966). This compound is converted to the 5-isoxazoleglycolic acid by treatment with aqueous nitrous acid. Alternatively, α-bromo-5-isoxazoleacetic acid when subject to mild hydrolytic conditions yields the 5-isoxazoleglycolic acid. Similarly, isoxazole-3-acetic acid is converted to the ethyl ester. The ester is brominated with N-bromosuccinimide and, after saponification, the resulting bromo acid is reacted with ammonia to give isoxazole-3-glycine. Isoxazole-3-glycolic acid is prepared by an analogous reaction sequence. For the preparation of isoxazole-4-glycolic acid and isoxazole-4-glycine, isoxazole-4-carboxylic acid is converted to isoxazole-4-acetic acid via an Arndt-Eistert reaction and the resulting heterocyclic acetic acid is carried through the reaction sequence just described. Tetrazole-5-glycine and 5-glycolic acid are prepared from the corresponding tetrazole-5-carboxaldehyde via the hydantoin and cyanohydrin, respectively. The 5-tetrazolecarboxaldehyde is prepared by oxidation of 5-hydroxymethyltetrazole using activated manganese dioxide in methylene chloride. 2-Methyltetrazole-5-glycine and the corresponding 5-glycolic acid are prepared starting with 5-dichloromethyltetrazole. This is alkylated using dimethyl sulfate, and the gem-dichloromethyl group is subsequently hydrolyzed to the aldehyde grouping using sodium acetate. The 2-methyltetrazole-5-aldehyde is converted to the glycine and glycolic acid by the methods already described.

Both 1,2,3-triazole-4-carboxaldehyde and 1-methyl-1,2,3-triazole-4-carboxaldehyde are converted to the respective 1,2,3-triazole-4-glycolic acid and 1-methyl-1,2,3-triazole-4-glycolic acid by way of the intermediate cyanohydrins. Likewise, these aldehydes, when subject to the Strecker synthesis, yield the corresponding 1,2,3-triazole-4-glycine and the 1-methyl-1,2,3-triazole-4-glycine. Similarly, 1,2,4-triazole-3-carboxaldehyde and 4-methyl-1,2,4-triazole-3-carboxaldehyde yield the corresponding 3-glycines and 3-glycolic acids via the Strecker and cyanohydrin reaction, respectively. Imidazole-4-glycine [Schneider, Z. Physiol. Chem. 324, 206 (1961)] is converted to imidazole-4-glycolic acid by treatment with aqueous nitrous acid. 1,3,4-Oxadiazole-2-acetic acid can be brominated on the α-carbon atom using N-bromosuccinimide and the bromine atom can be displaced by hydroxyl or amino according to the procedures already described. Pyrazole-3-aldehyde reacts with hydrogen cyanide to give the cyanohydrin, which can then by hydrolyzed to the corresponding pyrazole-3-glycolic acid. If the aldehyde is reacted with sodium cyanide and ammonium carbonate, the hydantoin is obtained which can then be hydrolyzed to pyrazole-3-glycine. Similarly, 1-methylpyrazole is converted to 1-methylpyrazole-4-carboxaldehyde by treatment with dimethylformamide and phosphorus oxychloride. This aldehyde can be converted to 1-methylpyrazole-4-glycolic acid and 4-glycine by the methods described for the 3-pyrazole analogs.

Pyridazine-3-carboxaldehyde, pyrazine-2-carboxaldehyde, pyrimidine-2-carboxaldehyde, pyrimidine-4-carboxaldehyde and pyrimidine-5-carboxaldehyde are known compunds. Pyridazine-4-carboxaldehyde and pyrimidine-2-carboxaldehyde can be prepared from their respective 4- and 2-methyl analogs by reaction with selenium dioxide. All of these aldehydes are converted to the corresponding glycine and glycolic acids via the Strecker synthesis and the cyanohydrin reaction followed by hydrolysis, viz., pyridazine-3-glycolic acid, pyridazine-3-glycine, pyridazine-4-glycolic acid, pyridazine-4-glycine, pyrazine-2-glycine, pyrazine-2-glycolic acid, pyrimidine-5-glycine, pyrimidine-5-glycolic acid, pyrimidine-4-glycine, pyrimidine-4-glycolic acid, pyrimidine-2-glycine, and pyrimidine-2-glycolic acid.

2-Hydroxy-1,3,5-triazine is converted to 2-chloro-1,3,5-triazine by treatment with phosphorus pentachloride. This is coupled with ethyl acetamidomalonate in the presence of sodium ethoxide and the resulting C-alkylated derivative is hydrolyzed to give 1,3,5-triazine-2-glycine. In a similar manner 3-5-dichloro-1,2,4-triazine is reacted with the sodio derivative of diethyl acetamidomalonate and the C-alkylated derivative is hydrolyzed with acid to give 3-chloro-1,2,4-triazine-5-glycine. Catalytic hydrogenation in the presence of palladium-on-charcoal results in 1,2,4-triazine-5-glycine. 1,3,5-Triazine-2-glycolic acid is prepared starting with 1,3,5-triazine-2-carboxylic acid by esterification, lithium aluminum hydride reduction to the triazinemethanol, oxidation of the hydroxymethyl group to the carboxaldehyde, reaction of the carboxaldehyde with hydrogen cyanide and subsequent alkaline hydrolysis.

The compounds of this invention, because of the assymetric carbon atom in the heterocyclic glycine and glycolic side chain, exist as diasteromers in which the 7-acyl group has the $d$ and $l$-configurations. These diasteromers as well as the side chain enantiomers are separated by well known methods. This invention is deemed to encompass both the mixture of diasteromers having the $d$ and $l$ configurations on the side-chain and the individual isomers.

Compounds of the invention in which M is hydrogen are readily converted into their pharmaceutically acceptable cationic, alkali metal, or organic ammonium salts by known methods. Conversely, these salts are converted into the free acids by conventional methods.

The following examples are intended to illustrate the preparation of the intermediates and products of the invention, but are not to be construed as limiting the scope thereof. Temperatures are in degrees Centigrade unless otherwise stated.

EXAMPLE 1

6-[2-Amino-2-(4-isothiazolyl)acetamido]penicillanic acid

In a solution of sodium methoxide (1.08 g., 0.02 mole) in 40 ml. of methanol is dissolved 4-isothiazoleglycine (3.16 g., 0.02 mole) by warming. Methyl acetoacetate (2.55 g., 0.022 mole) is added and the mixture is refluxed for an hour. The solvent is removed in vacuo. Benzene is added and distilled off several times to remove the methanol and water. The remaining solid is methyl acetoacetate ester enamine of 4-isothiazoleglycine sodium salt.

To a cold (−20°C.) acetone solution of methyl acetoacetate ester enamine of 4-isothiazoleglycine sodium salt (2.78 g., 0.01 mole) is added a trace amount of N-methylmorpholine followed by the slow addition of isobutyl chloroformate (1.40 g., 0.011 mole). Water (2 ml.) is added and the solution stirred a short time at −20°C. This solution is added gradually to a stirred cold aqueous solution of 6-APA triethylamine salt, prepared by adding triethylamine (1.4 ml., 0.01 mole) to a suspension of 6-APA in water. After stirring in the cold one hour the solution is raised to room temperature and is acidified to pH 2 with dilute hydrochloric acid. The solution is stirred a short period of time and then extracted with xylene. The aqueous phase is layered with methyl isobutyl ketone (MIBK) and the pH is adjusted to the isoelectric point of the product using tri-n-butylamine, in this case about 4, to give a solid which is collected and washed successively with MIBK, ethyl acetate and ether to give the desired product as its zwitter-ion.

EXAMPLE 2

6-[2-Hydroxy-2-(4-thiazolyl)acetamido]penicillanic acid

A solution of 4-thiazoleglycolic acid (1.59 g, 0.01 mol) in 50 ml of dry THF containing 2.0 g of N-trimethylsilylacetamide and 1.5 ml of triethylamine is heated at reflux under nitrogen for 2 hours. The solution containing the O-trimethylsilylglycolic acid is cooled to −10°, treated dropwise with 2.0 ml of isobutyl chloroformate and then allowed to stir at −10° for 20 minutes. To this stirring mixture is added during 30 minutes at −5° a solution of 6-APA (0.01 mol) in 40 ml of 50% aqueous THF containing 1.8 ml of triethylamine. After stirring at −5° for 1 hour and at room temperature for 1.5 hr, the THF is evaporated in vacuo and the residue diluted with 40 ml of water. The aqueous solution is extracted with ethyl acetate and the organic extract discarded. The aqueous phase is cooled in ice, layered with ethyl acetate and the pH adjusted to 1.5 with dilute HCl. The separated aqueous phase is extracted twice more with ethyl acetate and the combined organic layers are evaporated in vacuo to give a syrup. The syrup is dissolved in a mixture of ethyl acetate and methanol and treated with a slight excess of cyclohexylamine. Dilution with ether precipitates the product as a solid which is collected and dried.

EXAMPLE 3

6-[2-Hydroxy-2-(4-oxazolyl)acetamido]penicillanic acid

By substitution of 4-oxazoleglycolic acid for 4-thiazoleglycolic acid in Example 2, the title compound is obtained.

EXAMPLE 4

6-[2-Amino-2-(4-oxazolyl)acetamido]penicillanic acid

By substitution of 4-oxazoleglycine for 4-isothiazoleglycine in Example 1, the title compound is obtained.

EXAMPLE 5

6-[2-(Hydroxy-2-(5-isothiazolyl)acetamido]penicillanic acid

By substitution of 5-isothiazoleglycolic acid for 4-thiazoleglycolic acid in Example 2, the title compound is obtained.

EXAMPLE 6

6-[2-Amino-2-(5-thiazolyl)acetamido]penicillanic acid

By substitution of 5-thiazoleglycine for 4-isothiazoleglycine in Example 1, the title compound is obtained.

EXAMPLE 7

When the procedure of Example 1 is followed, but using the following heterocyclic glycines instead of the named heterocyclic glycine, the corresponding 6-(2-amino-2-heterocyclicacetamido)penicillanic acids are obtained.

Heterocyclic glycine
2-thiazoleglycine
2-oxazoleglycine
3-isothiazoleglycine
3-isoxazoleglycine
4-thiazoleglycine
4-imidazoleglycine
5-oxazoleglycine
5-isothiazoleglycine
1,2,3-triazole-4-glycine
1,2,4-triazole-3-glycine
5-isoxazoleglycine
2-methyloxazole-4-glycine
1,3,4-thiadiazole-2-glycine
5-tetrazoleglycine

EXAMPLE 8

When the procedure of Example 2 is used with any of the following heterocyclic glycolic acids instead of the named heterocyclic glycolic acid, the corresponding 5-(2-hydroxy-2-heterocyclicacetamido)penicillanic acids are obtained.

2-thiazoleglycolic acid
5-thiazoleglycolic acid
5-oxazoleglycolic acid
3-isothiazoleglycolic acid
4-isothiazoleglycolic acid
1,2,3-triazole-4-glycolic acid
1,2,4-triazole-3-glycolic acid
5-isoxazoleglycolic acid
5-tetrazoleglycolic acid

EXAMPLE 9

When the procedure of Example 1 is followed using any of the following heterocyclic glycines instead of the named heterocyclic glycine, the corresponding 6-(2-amino-2-heterocyclic acetamido)penicillanic acids are obtained.

pyrazineglycine
2-pyrimidineglycine
4-pyrimidineglycine
5-pyrimidineglycine
3-pyridazineglycine
4-pyridazineglycine
1,2,4-triazine-5-glycine
1,3,5-triazine-2-glycine
1,2,4-thiadiazole-3-glycine
1,2,4-thiadiazole-5-glycine
1,3,4-thiadiazole-2-glycine

EXAMPLE 10

When the procedure of Example 2 is followed using any of the following heterocyclic glycolic acids instead of the named heterocyclic glycolic acid, the corresponding 6-(2-hydroxy-2-heterocyclic acetamido)penicillanic acids are obtained.

4-isoxazoleglycolic acid
5-methyl-1,3,4-thiadiazole-2-glycolic acid
5-methyl-1,3,4-oxadiazole-2-glycolic acid
1,2,5-thiadiazole-3-glycolic acid
2-imidazoleglycolic acid
3-pyrazoleglycolic acid
1,2,3-triazine-4-glycolic acid
pyrazineglycolic acid
1,3,5-triazine-2-glycolic acid
1,2,4-triazine-5-glycolic acid
1,3,4-thiadiazole-2-glycolic acid
3-pyridazineglycolic acid

I claim:

1. A compound of the formula

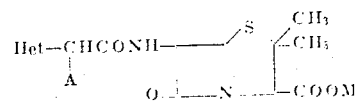

where Het is a triazolyl group;
A is OH or NH$_2$; and
M is H or a pharmaceutically acceptable cation, an alkali metal, or ammonium.

2. A compound as claimed in claim 1 where A is NH$_2$ and M is H.

3. A compound as claimed in claim 2, where Het is 1,2,3-triazol-4-yl.

4. A compound as claimed in claim 2, where Het is 1,2,4-triazol-3-yl.

5. A compound as claimed in claim 1, where A is OH and M is H.

6. A compound as claimed in claim 5, where Het is 1,2,3-triazol-4-yl.

7. A compound as claimed in claim 5, where Het is 1,2,4-triazol-3-yl.

* * * * *